INVENTOR.
HERMAN D. PARKS
BY
Brumbaugh, Free, Graves & Donohue
his ATTORNEYS.

Oct. 23, 1962 H. D. PARKS 3,060,413

MAGNETIC RECORD READING DEVICE

Filed April 28, 1958 9 Sheets-Sheet 2

INVENTOR.
HERMAN D. PARKS

BY Brumbaugh, Free, Graves & Donohue
his ATTORNEYS.

Oct. 23, 1962 H. D. PARKS 3,060,413

MAGNETIC RECORD READING DEVICE

Filed April 28, 1958 9 Sheets-Sheet 3

INVENTOR.
HERMAN D. PARKS

BY

Brumbaugh, Free, Graves & Donohue his ATTORNEYS.

INVENTOR.
HERMAN D. PARKS
BY
Brumbaugh, Free, Graves & Donohue
his ATTORNEYS.

Oct. 23, 1962 H. D. PARKS 3,060,413

MAGNETIC RECORD READING DEVICE

Filed April 28, 1958 9 Sheets-Sheet 5

INVENTOR.
HERMAN D. PARKS

BY

Brumbaugh, Free, Graves & Donohue
his ATTORNEYS.

Oct. 23, 1962 H. D. PARKS 3,060,413

MAGNETIC RECORD READING DEVICE

Filed April 28, 1958 9 Sheets-Sheet 6

INVENTOR.
HERMAN D. PARKS

BY

Brumbaugh, Free, Graves & Donohue his ATTORNEYS.

Oct. 23, 1962 H. D. PARKS 3,060,413

MAGNETIC RECORD READING DEVICE

Filed April 28, 1958 9 Sheets-Sheet 7

INVENTOR.
HERMAN D. PARKS

BY Brumbaugh, Free, Graves & Donohue his ATTORNEYS.

MAGNETIC RECORD READING DEVICE

Filed April 28, 1958 9 Sheets-Sheet 8

INVENTOR.
HERMAN D. PARKS

BY
Brumbaugh, Free, Graves & Donohue
his ATTORNEYS.

Oct. 23, 1962 H. D. PARKS 3,060,413

MAGNETIC RECORD READING DEVICE

Filed April 28, 1958 9 Sheets-Sheet 9

INVENTOR.
HERMAN D. PARKS

BY Brumbaugh, Free, Graves & Donohue
his ATTORNEYS.

United States Patent Office 3,060,413 Patented Oct. 23, 1962

3,060,413

MAGNETIC RECORD READING DEVICE

Herman D. Parks, Norwalk, Conn., assignor to Time, Incorporated, New York, N.Y., a corporation of New York Filed Apr. 28, 1958, Ser. No. 731,318
20 Claims. (Cl. 340—174.1)

This invention relates to devices for reading magnetic records and, more particularly, to a new and improved device arranged to extract a magnetic record from a storage position, reproduce a selected recording on the record and return the record to its storage position.

Generally, a random access memory comprises a large number of units of record information, each of which may be recorded on a length of magnetic wire, for example, and stored at a known physical location or "address." In order to reproduce a selected unit of information, a magnetic transducer is transported to the corresponding address and driven along the length of magnetic wire stored at that location in the customary manner. In practice, it is convenient to store a large number of information units on a single frame and arrange a large quantity of frames in a storage rack, the transducer being included in a reading device arranged to withdraw a selected frame from the rack to record or reproduce information on one of the lengths of wire mounted on the frame. With this arrangement, the reading device must include mechanism for selecting the proper length of wire on a particular frame as well as apparatus for withdrawing the frame from the storage rack, holding it in position while the transducer is driven along the selected wire, and returning the frame to the storage rack.

Accordingly, it is an object of this invention to provide a new and improved magnetic record reading device adapted to withdraw a magnetic record frame from a storage rack, select an information record mounted on the frame, record or reproduce an information unit thereon, and restore the frame to its position in the rack.

Another object of the invention is to provide a device of the above character which is especially adapted to operate with optimum fidelity in recording and reproducing.

Yet another object of the invention is to provide apparatus for carrying out the above operations in a minimum time.

Still another object of the invention is to provide apparatus for reading magnetic record wires mounted in closely spaced relation on both sides of a frame member.

A further object of the invention is to provide a magnetic record reading device of simple design and compact arrangement of components.

These and other objects of the invention are accomplished by supporting a magnetic transducer on a movable platform in a reading device and providing guides to receive a magnetic record frame from a rack and position it with respect to the reading device to hold the magnetic wires at known positions with respect to the transducer. In order to drive the platform and the transducer to any of a series of positions adjacent the magnetic wires, a lead screw is controlled by an escapement device permitting a step-by-step motion, the screw being locked in position thereby when the transducer is at a selected position. Movable with the platform an arcuate track member is movable at one end to advance the transducer into operative relation with a selected wire. In addition, while the transducer is swept lengthwise of the wire, the track guides the transducer in a path curved toward the frame, thereby maintaining constant wire tension. At the same time, guides on the transducer mount follow the arcuate track member to position the transducer at the proper angle to the wire at each point during its sweep so that the wire approaches the magnetic gap of the transducer at the same angle from both sides throughout the reading or recording operation. In one embodiment of the invention, the reading device includes frame guides and a magnetic transducer on each side of the platform and dolly mechanism movable parallel to the guides for drawing the frame into position in the guides from racks at either end of the reading device.

Further objects and advantages of the invention will be apparent from a reading of the following description in conjunction with the accompanying drawings in which.

Figure 1:
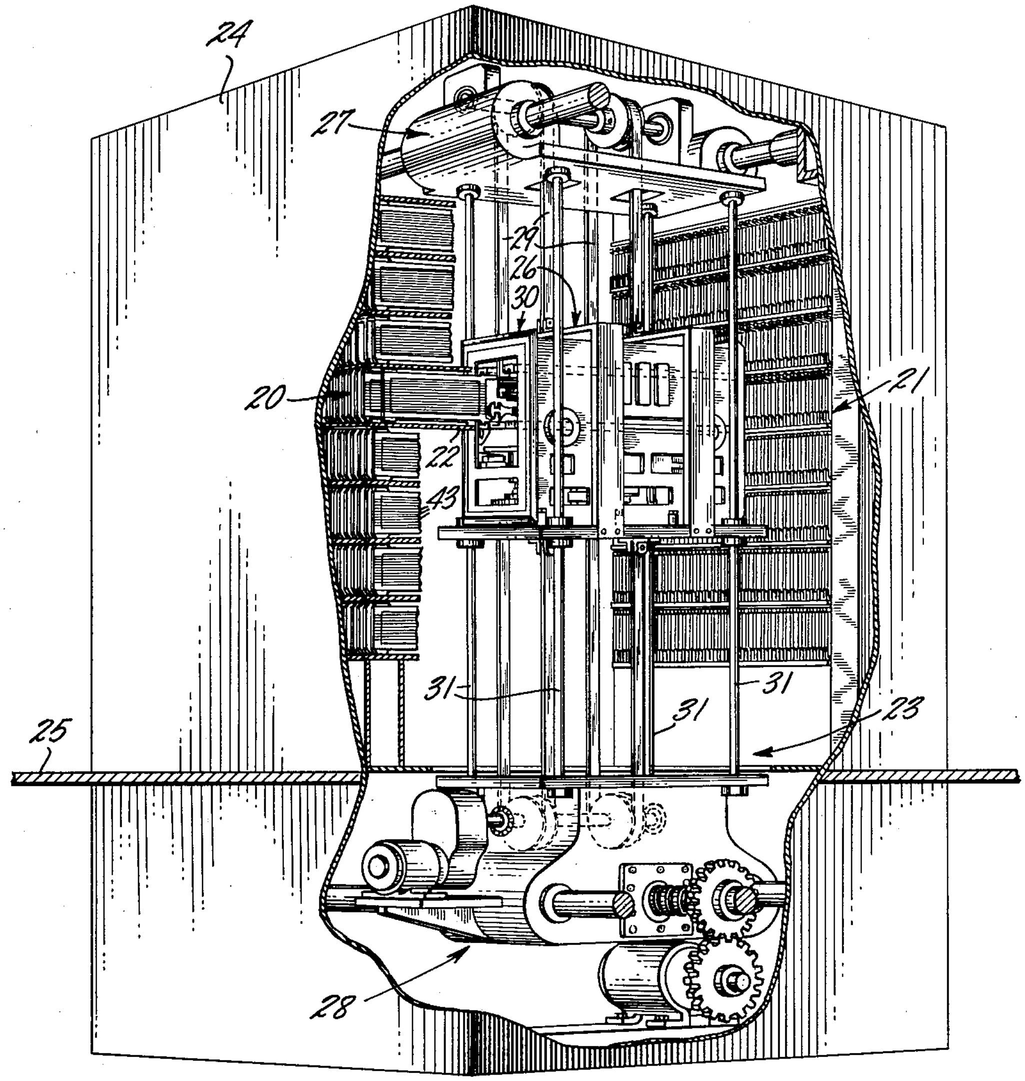
FIG. 1 is a view in perspective, partly broken away, illustrating a typical random access memory utilizing a record reading device arranged according to the invention.

As illustrated in FIG. 1, a typical random access memory arranged according to the invention comprises two parallel racks 20 and 21 each holding an array of magnetic record frames 22 all of which are accessible from a central aisle 23, the entire structure being enclosed in a cabinet 24 and supported by a platform 25. Mounted on a carriage 26, which is driven between upper and lower drive assemblies 27 and 28 by drive belts 29, a record reading device 30 is horizontally and vertically movable within the aisle 23 by the drive assemblies 27 and 28. Thus, the reading device, which extends the width of the aisle and has openings at each end adjacent the racks 21 and 22, can be positioned to receive any selected frame 22 from either of the racks, the carriage 26 being guided vertically by shafts 31 extending between the upper and lower drive assemblies. As more fully described hereinafter, each frame 22 may be drawn into either of two reading positions in the reading device 30 to enable the device to read the information from magnetic wires 43 mounted on either side of the frame, each length of wire 43 being supported horizontally at a predetermined distance from the top of the frame. Accordingly, the apparatus includes any suitable control mechanism, not forming a part of this invention, which responds to an address signal indicating the location in the racks 21 and 22 of a selected frame and the position of a selected wire on the frame, to control the drive assemblies 28 and 29 so that the reading device 30 can receive the selected frame in the appropriate reading position to read the selected wire.

Figure 2:
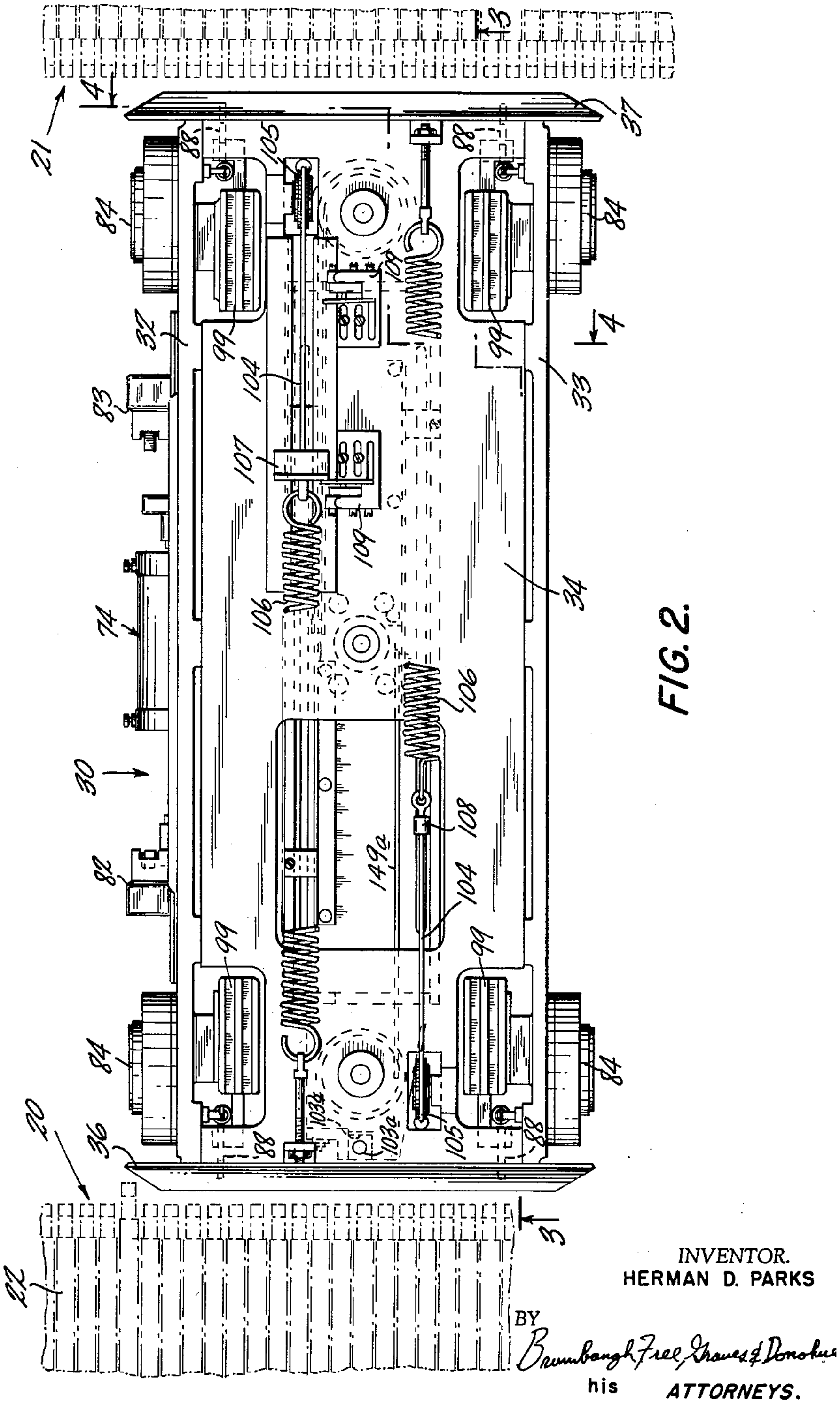
FIG. 2 is a plan view of a typical magnetic record reading device constructed in accordance with the invention.
Figure 3:
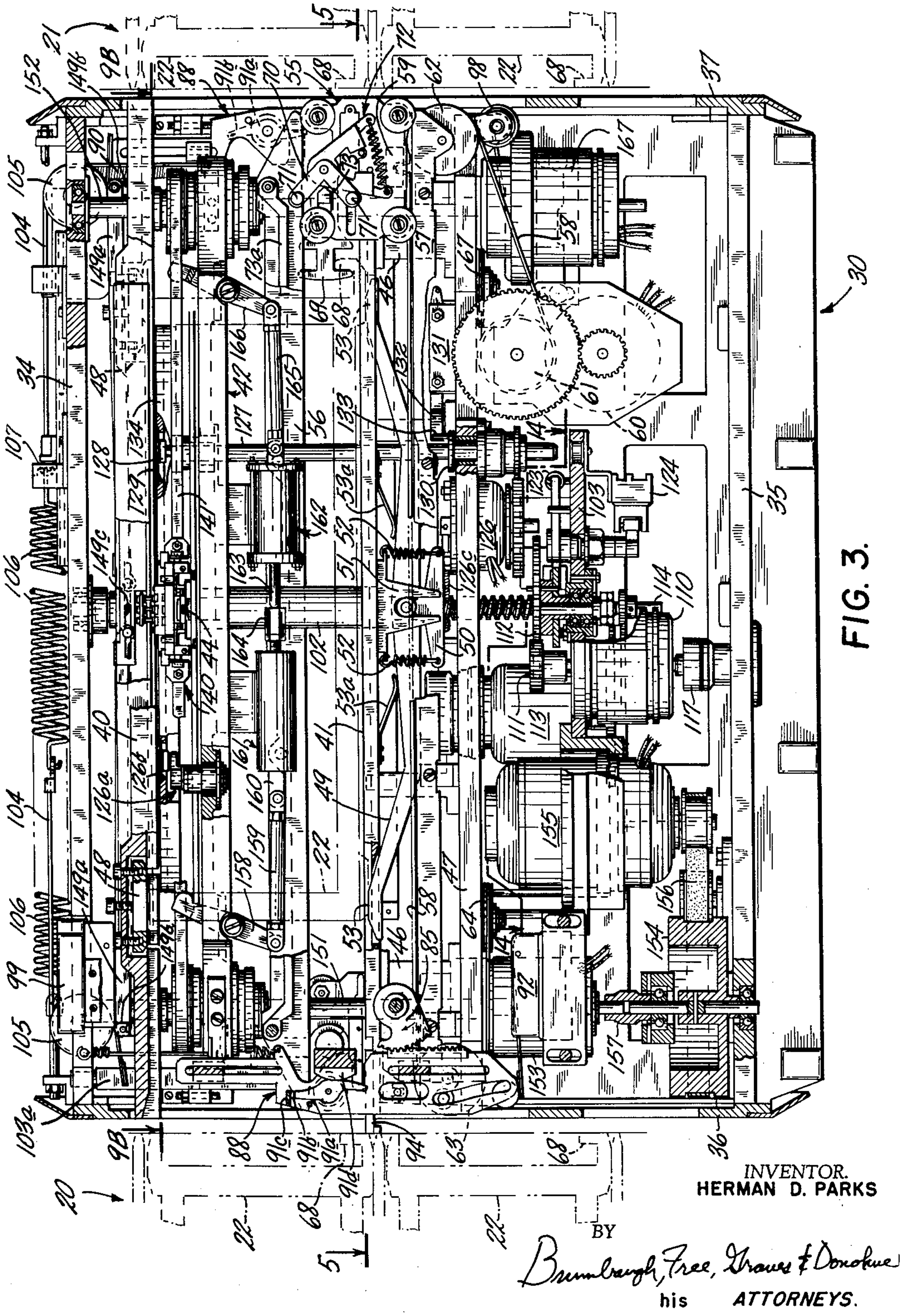
FIG. 3 is a side view of the reading device in vertical section taken on the lines 3—3 of FIG. 2 and looking in the direction of the arrows.
Figure 4:
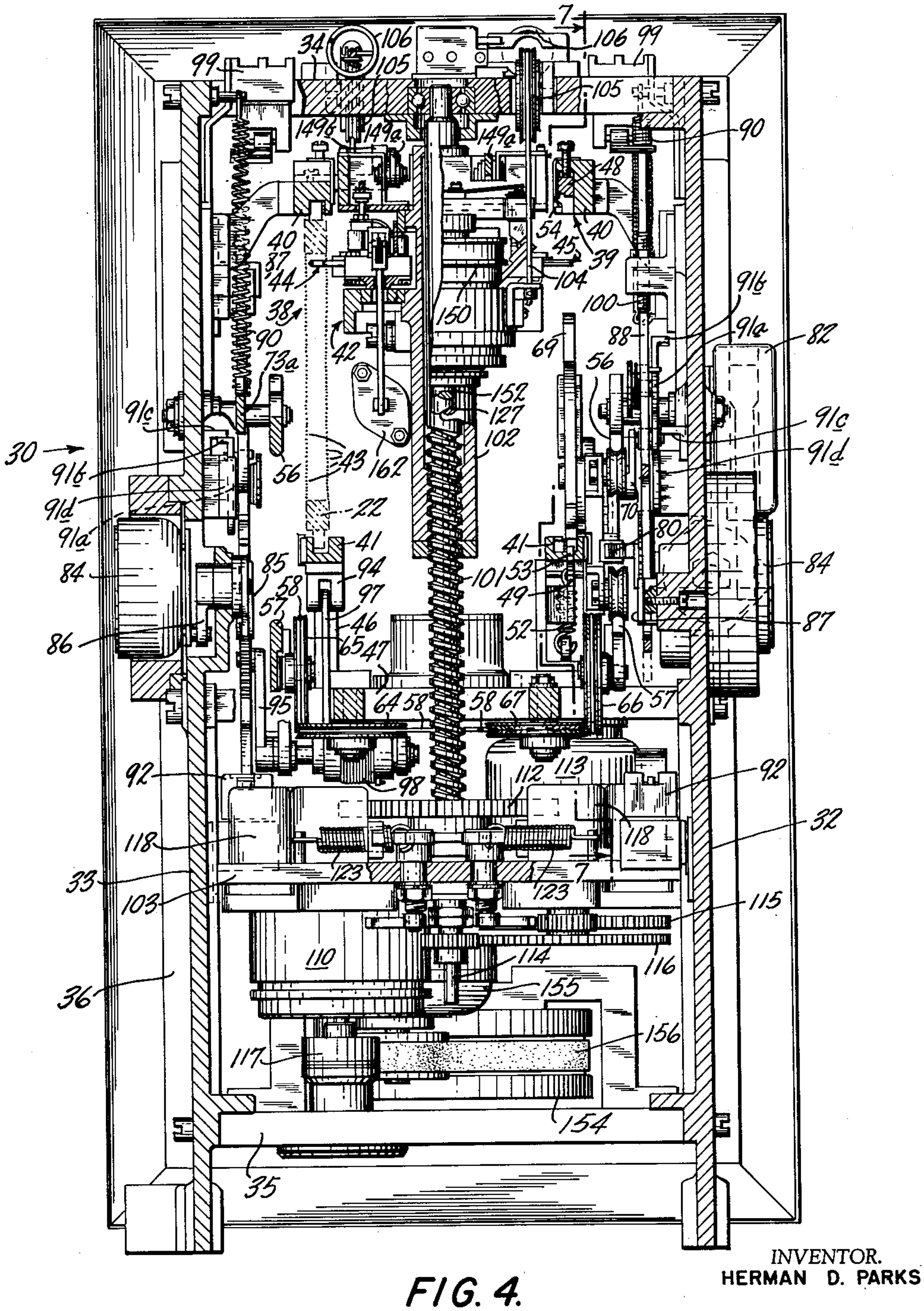
FIG. 4 is an end view in vertical section taken on the lines 4—4 of FIG. 2 and looking in the direction of the arrows.

Referring to FIGS. 2, 3 and 4, the reading device 30 comprises a housing having two side plates 32 and 33, top and bottom plates 34 and 35, and end plates 36 and 37, the end plates 36 and 37 being adjacent to the racks 20 and 21, respectively, and having bevelled edges to cam back into its storage position any frame 22 which might project slightly from either rack. As best seen in FIG. 4, the reading device 30 includes two reading positions 38 and 39 into which a wire record frame 22 may be drawn. Each of these positions is defined by an upper channel guide 40 and a lower channel guide 41, the positions being disposed on opposite sides of a central platform 42. Thus, the magnetic record wires 43 supported on one side of a frame 22 can be read in the reading position 38 by a magnetic transducer 44 mounted on one side of the platform 42, while the record wires on the other side of the frame can be read by another transducer 45 mounted on the opposite side of the platform when the frame is in the position 39, the upper guides 40 being supported from the side plates 32 and 33 and the lower guides 41 being affixed to blocks 46 supported on a midplate 47 extending between the side plates.

Figure 5:
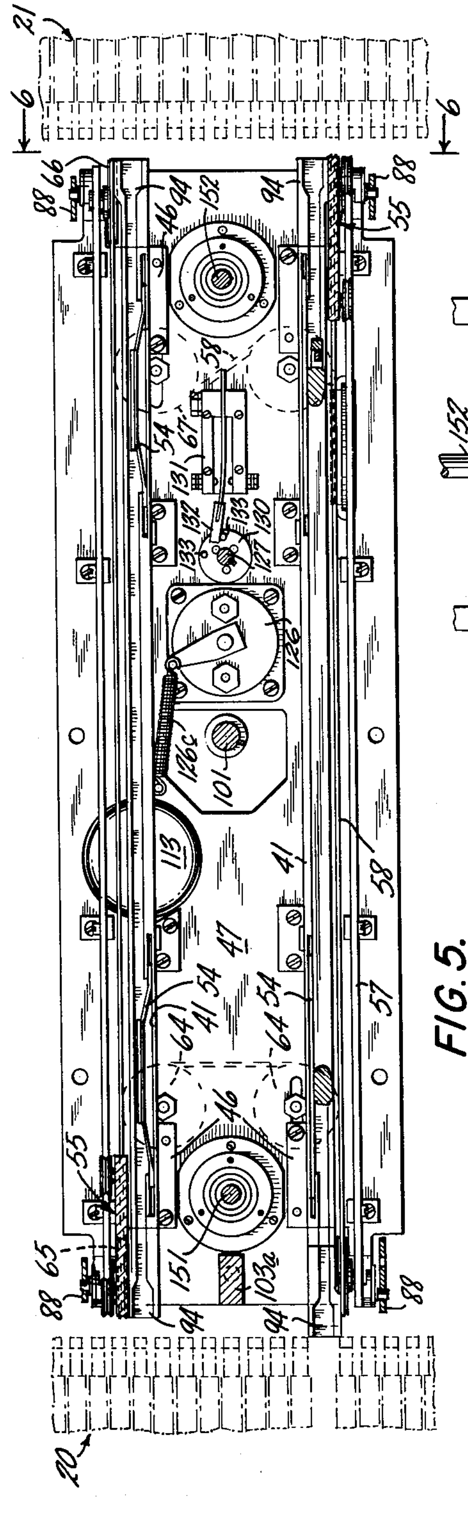
FIG. 5 is a plan view in horizontal section taken through the reading device on the lines 5—5 of FIG. 3.

Inasmuch as each record wire 43 extends horizontally on its frame 22 at a predetermined vertical distance from the top of the frame, each upper guide 40 includes adjustably mounted positioning blocks 48 to receive the top surface of a frame in the reading position, the blocks being adjusted to locate the frames 22 and their record wires at known vertical positions with respect to the housing. In addition, a lever 49 mounted below each reading position extends through the bottom of the lower guide 41 at each end and is pivotally supported by a fulcrum 50 which is vertically slideable in a mount 51 attached to the lower channel, the fulcrum being urged upwardly in the mount 51 by two springs 52. Thus, when a frame 22 is in a reading position, as shown in FIG. 3, both ends 53 of the lever 49 contact the bottom surface of the frame and press it upwardly against the positioning blocks 48, the lever 49 being normally retained in a horizontal position by two leaf springs **53*a*. Furthermore, as best seen in FIG. 5, each of the channel guides includes two leaf springs 54** along its inside edge to urge the frame outwardly, laterally positioning it against the outside edge of the channel guide.

In order to withdraw a selected frame 22 from either of the racks 20 and 21 into a reading position, a dolly 55 on each side of the reading device is supported in upper and lower tracks 56 and 57 mounted on the side plates 32 and 33 and the mid-plate 47, respectively, to move parallel to the channel guides from one end of the reading device to the other. Both the dollys 55 are driven by a common cable 58 to which they are secured by clamps 59, and as shown in FIG. 3, a drive motor 60, mounted beneath the mid-plate 47, is geared to a drum 61, about which the cable is wound. From the drum 61, the cable 58 extends over a vertical pulley 62 and horizontally to the dolly on one side and thence to the opposite end of the reading device, over another pulley 63, and around two horizontal pulleys 64 mounted below the mid-plate 47 as best seen in FIG. 5. On the other side of the reading device the cable passes over a vertical pulley 65 (shown in FIG. 7) to the dolly on that side, returning to the drum 61 by way of a vertical pulley 66 and two more horizontal pulleys 67 mounted below the mid-plate.

After an address signal initiating its operation has been received, the reading device 30 is driven in the horizontal and vertical directions in the aisle 23 to the location of a selected frame, aligning the proper reading position 38 or 39 with the frame according to the position of the selected wire on the frame. At the same time, in accordance with the address signal, the drive motor 60 turns the drum 61 in the direction to move the dolly 55 located adjacent the appropriate frame reading position 38 or 39 to the end of the reading device next to the rack 20 or 21 where the selected frame 22 is stored. Projecting toward the aisle 23 a hook 68 on each frame 22 facilitates withdrawal of the frame from the rack, and when the dolly 55 is positioned next to a selected frame, a claw 69 pivotally mounted on the dolly in the plane of the guides 40 and 41 can be rotated from its normal vertical position, shown in FIG. 7, to a horizontal position engaging the hook 68 to connect the selected frame to the dolly. Thus, when the dolly is driven in its tracks to the opposite end of the reading device, it draws the selected frame 22 into the reading position as illustrated in FIG. 2, the length of the claw 69 being selected to position the frame centrally in the guides 40 and 41 when the dolly is at the end of its tracks.

In order to pivot its claw from the inactive vertical position to an active horizontal position toward either rack, each dolly 55 includes a crank arm 70 keyed to the claw 69 to rotate it about its axis, the crank arm being mounted on the opposite side of the dolly and having two legs extending at angles of 45° to the length of the claw, each leg terminating with a horizontal pin 71. Normally urged toward its vertical position by a spring arrangement designated generally by the numeral 72, the claw 69, when rotated to a horizontal position toward either end by the crank arm 70, is held horizontally by a detent mechanism 73 until returned to the vertical position by rotation of the crank arm. In addition, the pins 71 are positioned to slide along the lower surface of a horizontal guide bar **73*a* mounted on the side plate when the claw 69 is in the vertical position or in either horizontal position as the dolly travels from one end of the reading device to the other, thus preventing rotation of the crank arm 70 and the claw 69** during the dolly motion.

Figure 8:
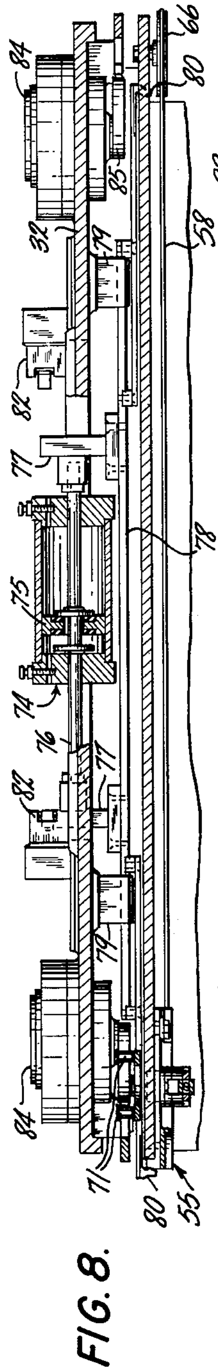
FIG. 8 is a sectional view taken on the lines 8—8 of FIG. 7.
Figure 7:
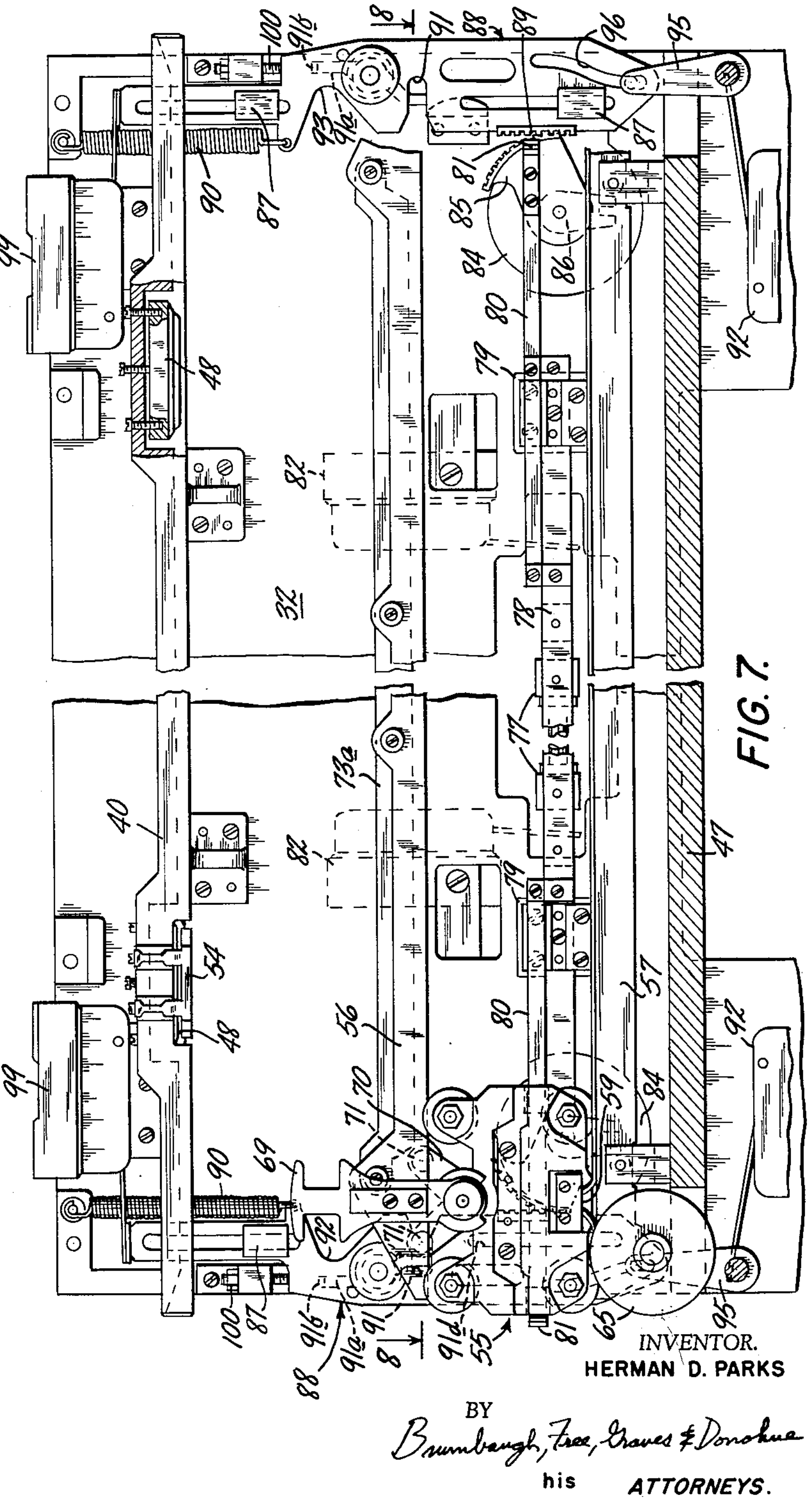
FIG. 7 is an enlarged elevation in section, partly broken away, taken on the lines 7—7 of FIG. 4.

As best seen in FIGS. 7 and 8, the motion of both the dollys 55 in their tracks 56 and 57 is braked at each end by a dash-pot 74 affixed to the side plate 32 and having a plunger 75 actuated by a shaft 76 passing through the dash-pot. At each end of the shaft 76 a mount 77 attached to the shaft is secured to a slide-bar 78 slideably supported in guides 79 extending from the side plate 32. In order to intercept the dolly 55 adjacent the side plate 32 at each end of its travel, extension members 80 affixed to each end of the slide-bar 78 extend toward the opposite ends of the reading device and carry studs 81 projecting into the path of the dolly near each end of its tracks, thereby linking the dolly to the dash-pot 74 as it approaches either extreme position to brake both dollys 55 and the dolly drive system to a stop. Also, whenever the dollys are in either extreme position, one of the mounts 77 actuates a corresponding switch 82 or 83, signalling the control system that the motion of the dollys has been completed. Thus, when the dolly 55 adjacent the plate 32 is at the end of its tracks toward the rack 20 and the other dolly is next to the rack 21, the switch 82 is actuated, as illustrated in FIGS. 7 and 8, the switch 83 being operated when the dollys are at their other extreme positions.

As best seen in FIG. 2, a rotary solenoid 84 is mounted at each end of each of the side plates 32 and 33, and when one of the dollys 55 is in position to withdraw a selected frame from one of the racks, as indicated by actuation of the appropriate switch 82 or 83, the solenoid 84 adjacent that dolly is energized, turning a gear segment 85 through a crank arm 86. Slideably mounted in the vertical direction on studs 87 at each end of both side plates, as best seen in FIG. 7, an actuating plate 88 carries a rack 89 meshing with the gear segment 85 and is spring biased upwardly by a spring 90 attached to the side plate. Accordingly, energization of the solenoid 84 drives the plate downwardly to a lower position, and deenergization of the solenoid permits the spring 90 to return the plate to an upper position. Facing the end of the guide bar 73*a*, a lower notch 91 in the actuating plate is positioned to receive the nearest pin 71 of the crank arm 70 when the dolly is at the end of its track and the plate 88 is in its upper position. Thus, when the actuating plate 88 is pulled to its lower position in response to energization of the solenoid 84, the claw 69 is rotated downwardly by the crank arm 70 to a horizontal position to engage the hook 68 of the selected frame 22.

When it moves into the notch 91, the pin 71 engages the lower end of a spring-biased latch lever 91*a* mounted on the plate 88 cocking the spring and rotating the top end of the lever toward the interior of the reading device. Referring to FIG. 4, it will be seen that the lever 91*a* includes a lateral projecting stud 91*b* at the top end while a stop 91*c*, vertically aligned with the stud 91*b* when the latch lever is in its normal position, projects inwardly from the side plate of the reading device. Thus, when the plate 88 is pulled downwardly by the solenoid 84, the stud 91*b* is held out of line with the stop 91*c*, the latch lever having been rotated by the pin 71. Also mounted on the side plate a cam surface 91*d* projects toward the dolly 55 and guides the pin 71, holding it in the notch 91 while the plate 88 moves from the upper to the lower position, thus preventing the dolly 55 from moving away from its extreme position. When this action is completed, a switch 92, operated by the lower end of the actuating plate 88, signals the dolly drive mechanism to draw the frame 22 into the reading position in the guides 40 and 41, another notch 93 being provided in the actuating plate above the notch 91 to accommodate the other pin 71 when the claw 69 is in the horizontal position.

Withdrawal of the pin 71 from the lower notch 91 as the dolly is pulled away from the actuated plate releases the lower end of the latch lever 91*a* allowing the latch spring to return the stud 91*b* to a position beneath the stop 91*c*. This holds the actuating plate in its lower position, permitting the solenoid 84 to be deenergized until the next withdrawal operation. When the record frame 22 is returned to its position in the rack, the pin 71 again enters the lower notch 91 pivoting the latch lever 91*a* to release the stud 91*b* from the stop 91*c*. As the spring 90 pulls the actuating plate back to its upper position, the lower notch 91 raises the pin 71 to turn the crank arm 70, pivoting the claw 69 back to its inactive vertical orientation.

Figure 6:
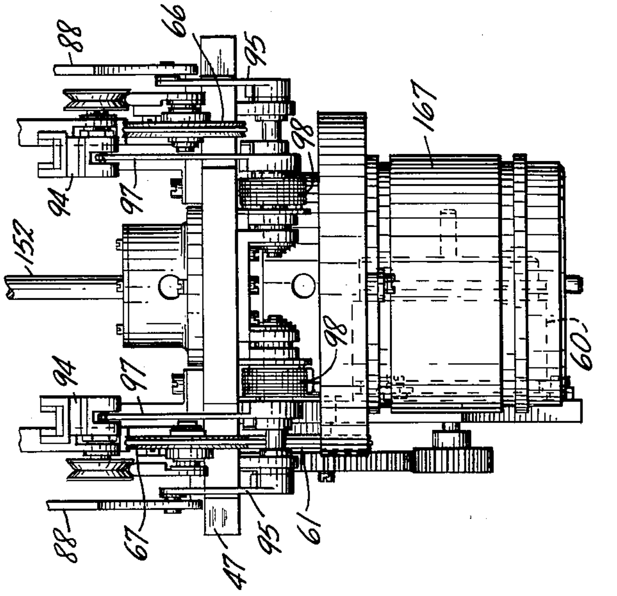
FIG. 6 is a fragmentary end view taken on the lines 6—6 of FIG. 5 looking in the direction of the arrows.

In order to provide a continuous path for a frame 22 during its motion from the rack 20 or 21 to the guides 40 and 41 a guide extension 94 is slideably mounted at each end of each of the lower guides 41, as best seen in FIGS. 5 and 6. When the actuating plate 88 moves downwardly to rotate the claw toward the frame, a crank arm 95 is pivoted outwardly by a cam slot 96 formed in the plate shown in FIG. 7, rotating a lever 97, coaxial with the crank arm. As best seen in FIG. 4, the lever 97 is normally urged toward the center of the reading device by a torsion spring 98 and is linked at its upper end by a pin and slot arrangement to the bottom of the adjacent guide extension 94. Thus, when the solenoid 84 is energized to connect the dolly 55 and the selected frame, rotation of the lever 97 slides the channel extension 94 outwardly toward the rack to direct the frame 22 into the guides 40 and 41. As the actuating plate 88 returns to its upper position the cam slot 96 returns the crank arm 95, retracting the guide extension into the reading device. In order to detect the return of the actuating plate 88 a switch 99 is mounted on the side plate to intercept the top of the plate at its upper position, this position being regulated by means of an adjustable screw stop 100 to align the top of the lower notch 91 with the lower edge of the guide bar 73*a*.

Elevation of the magnetic transducers 44 and 45 to a vertical position with respect to the positioning blocks 48 corresponding to that of a selected wire 43 on a frame 22 is accomplished by rotating a lead screw 101 threaded in a nut 102 which is secured to the platform 42, thereby driving the platform 42 and the transducers mounted thereon in the vertical direction. Inasmuch as the lead screw 101 is vertically fixed in position between the top plate 34 and a lower deck 103 supported below the mid-plate 47, the transducers 44 and 45 are movable to any accurately determined vertical distance from the positioning blocks 48 by a predetermined rotation of the lead screw, the platform 42 being held in fixed angular position by a vertical shaft 103*a* extending between the plates 34 and 47 and slidably received in a recess 103*b* at one end of the platform. As illustrated in FIGS. 2, 3 and 4, a portion of the weight of the platform is supported by cables 104 attached at each end of the platform, each passing over a pulley 105 to a spring 106 mounted on the top plate 34, the cables being held by guides 107 and 108 slidably mounted on the top plate. In order to prevent the platform 42 from being driven too far in either direction, two switches 109 mounted on the top plate are positioned to be operated by the guide 107 when the platform reaches either extreme position, turning off the platform drive mechanism.

Figure 14:
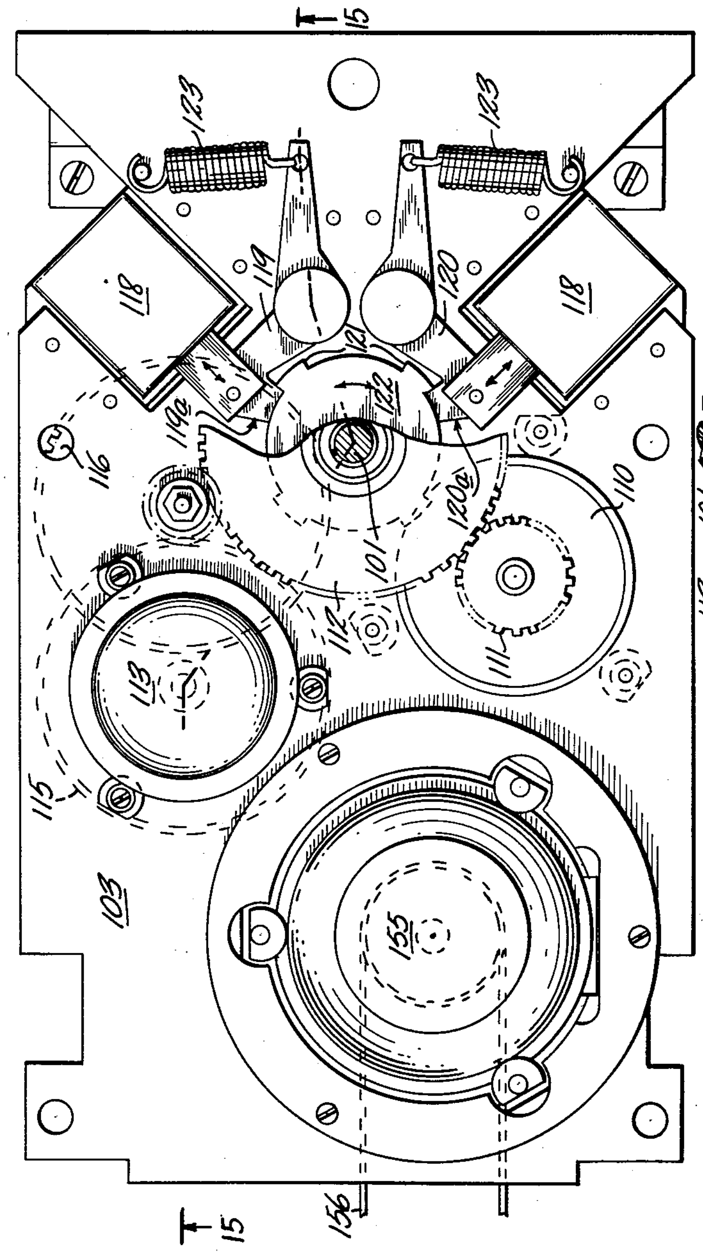
FIG. 14 is a partial sectional view taken on the lines 14—14 of FIG. 3.
Figure 15:
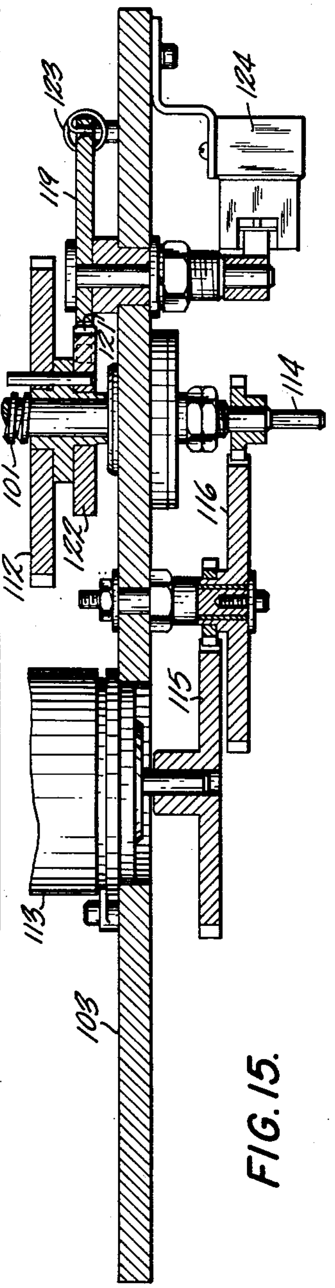
FIG. 15 is a view in section taken on the lines 15—15 of FIG. 14 and looking in the direction of the arrows.

As shown in FIGS. 3, 15 and 16, a reversible drive motor 110, connected to the lead screw 101 through a pinion 111 and a gear 112, drives the lead screw in either direction under the control of a signal comparing device 113. In order to detect the vertical location of the transducers, a shaft 114 which turns with the lead screw is linked to the comparer 113, which may comprise any suitable device for comparing two signals and indicating their difference, through two gears 115 and 116. In this manner, the angular position of the lead screw 101 is transmitted to the comparer as an indication of the vertical location of the platform 42 and this location is compared with the vertical location of the selected wire as represented by the address signal, which is also transmitted to the comparer. In response to the difference between these locations the motor 110 drives the platform 42 and the transducers 44 and 45 toward the position of the selected wire at high speed until the transducers are within a predetermined distance, for example, eight wire intervals, from the required position. At that time, the comparer actuates a conventional electric brake 117, shown in FIGS. 3 and 4, to slow down the motor operation and also actuates an escapement mechanism controlled by two solenoids 118. The escapement mechanism comprises two pawl levers 119 and 120 positioned to engage the teeth 121 of a ratchet wheel 122 which is pinned to the drive gear 12 as shown in FIGS. 14 and 15. Each of the pawl levers is held away from the ratchet wheel by energization of a corresponding solenoid 118 and is urged toward the ratchet wheel by a spring 123 when the corresponding solenoid is deenergized, two switches 124 mounted below the plate 103 being actuated by rotation of the pawl levers to indicate engagement of the corresponding pawl with the ratchet wheel.

During the high speed operation of the motor both the pawl levers 119 and 120 are held away from the ratchet wheel 122 by activation of both the solenoids 118, permitting the lead screw 101 to turn freely. However, when the transducers are within a predetermined vertical distance from the selected wire, as indicated by the comparing device 113, the solenoids 118 are energized alternately to restrict the lead screw 101 to a controlled, step-by-step motion, each step moving the platform 42 a distance equal to the interval between adjacent record wires 43 on the frame. This escapement operation continues until the transducers are at the same vertical position as the selected wire, when both the solenoids 118 are deenergized to lock the ratchet wheel 122 and the lead screw 101. Thus, if the motor 110 is energized to urge the lead screw and the ratchet wheel 122 in the clockwise direction, as viewed in FIG. 14, and the pawl 120 is retracted by energization of its solenoid 118, the ratchet wheel 122 will turn one-eighth rotation in the clockwise direction, corresponding to the interval between two adjacent wires, and is there stopped by one of the teeth 121 engaging the outside edge 119*a* of the pawl 119. Return of the pawl 120 toward the wheel 122 places its outside edge 120*a* against the tooth 121 formerly adjacent its inside edge, locking the ratchet wheel in position. Withdrawal of the pawl 119 by energization of its solenoid after the pawl 120 has returned releases the tooth 121 from its outside edge 119*a* permitting the ratchet wheel to turn another eighth rotation, and restoring of the pawl 119 with the wheel in this position locks the teeth between the pawls in the manner shown in FIG. 14.

Inasmuch as the electrical circuit for controlling the alternate operation of the solenoids 118 in this manner is conventional and may be any well-known arrangement, it is not set forth in detail herein. Suffice it to say that whenever one pawl is against the ratchet wheel 122 the corresponding switch 124 permits the other pawl to be retracted by its solenoid under the control of the comparing device 113. Similarly, the circuit arrangements for controlling the operation of other electrical elements referred to hereinafter are all well known and may be of any suitable type and, therefore, they are not described in detail.

Figures 9A, 9B, 12, 13:
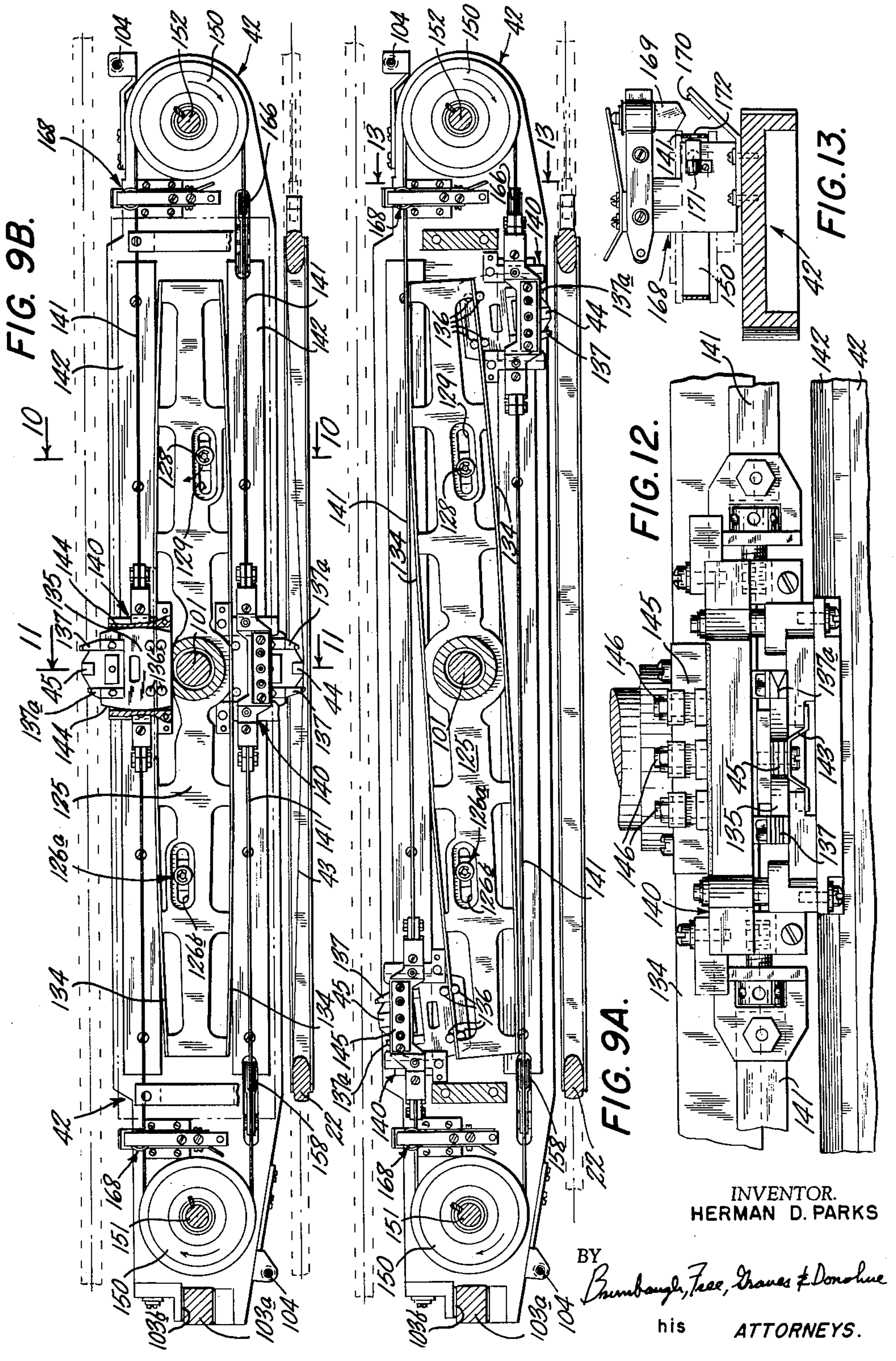
FIGS. 9A and 9B are sectional views taken on the lines 9B—9B of FIG. 3 illustrating the transducer and its guiding track in the retracted and engaged positions respectively.
FIG. 12 is an enlarged side view illustrating the mounting of a magnetic transducer in accordance with the invention.
FIG. 13 is an enlarged sectional view taken on the lines 13—13 of FIG. 9A and looking in the direction of the arrows.
Figure 11:
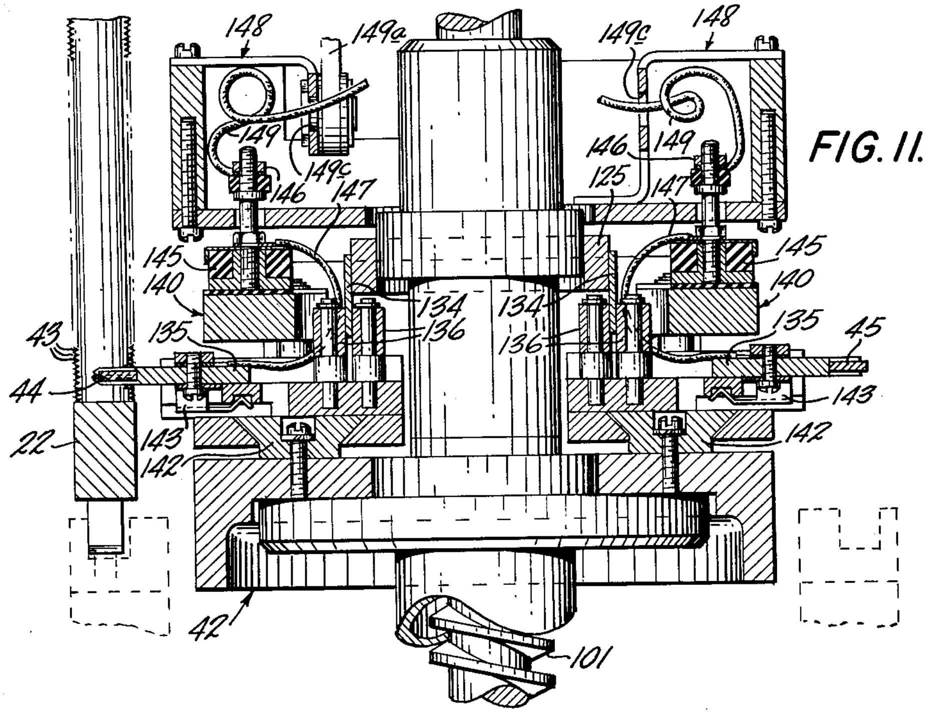
FIG. 11 is a view similar to that of FIG. 10 taken on the lines 11—11 of FIG. 9B.

In order to control the lateral position of the transducers 44 and 45, the platform 42 includes a guide member 125 mounted to pivot between two angular positions about the lead screw 101. When the transducers are in starting position at opposite ends of the guide member, counter-clockwise pivoting of the guide member as viewed from above, retracts the transducers to an inoperative position as shown in FIG. 9A to avoid interference with a frame 22 in the guides 40 and 41 when the frame or the platform 42 is in motion. Clockwise rotation of the guide member through a small angle to a second position after the frame is in a reading position extends the transducers, permitting one of them to move into operative relation with a selected wire 43 on the frame, as illustrated in FIG. 9B. In FIG. 9A, the transducers 44 and 45 are shown in the inoperative position, the guide member being in its counterclockwise orientation, while in FIGS. 3, 4, 9B, 10, 11 and 12 they are illustrated at the mid-point of their sweep motion.

Figure 10:
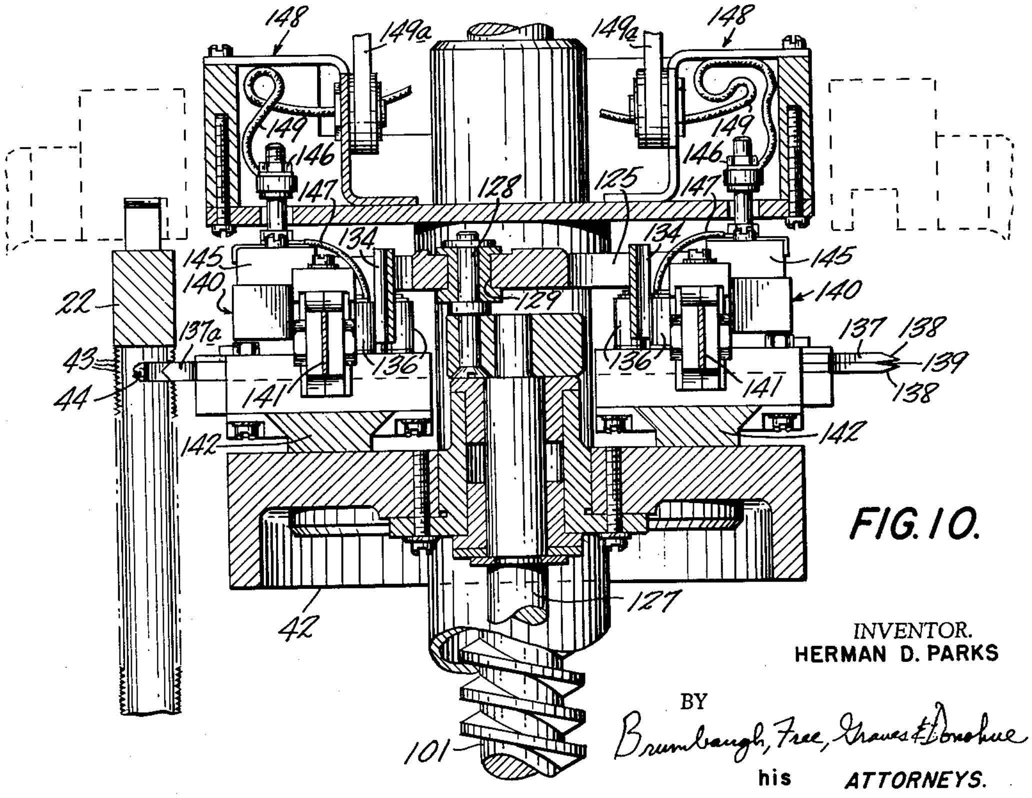
FIG. 10 is an enlarged fragmentary view taken on the lines 10—10 of FIG. 9B and looking in the direction of the arrows.

Mounted below the mid-plate 47 a rotary solenoid 126 pivots the guide member 125 to the clockwise position by turning a vertical shaft 127 having an off-set pin 128 at its upper end fitting into a slot 129 in the guide member, as best seen in FIG. 10. Passing through the mid-plate 47, the shaft 127 is keyed to and slidable through a rotatably mounted insert 130 geared to the solenoid 126 to permit vertical motion of the guide member 125 with respect to the solenoid. As the guide member 125 rotates a spring device 126*a*, affixed to the platform 42 and similarly engaging another slot 126*b* with an off-set pin, is cocked so that when the solenoid is deenergized the spring device returns the guide member to the counter-clockwise position, another spring 126*c*, shown in FIG. 5, restoring the solenoid armature. As best seen in FIG. 5, a switch 131 mounted on the top of the plate 47, having an actuator arm 132 positioned between two pins 133 extending upwardly from the insert 130, is operated by rotation of the insert to indicate the completion of the angular motion of the guide member 125 toward each of its positions.

For optimum efficiency of recording and reproduction of record information, the tension of a magnetic wire 43 mounted on the frame 22 must be maintained substantially constant during the entire sweep motion of a transducer from one end of the wire to the other and, furthermore, the wire should approach the magnetic gap of the transducer at the same angle from each side to provide equal lengths of wire in contact with the transducers on each side of the magnetic gap. To this end, a curved track 134 extends downwardly from each side of the guide member 125 to guide the motion of the transducers in a predetermined arc and control their angular orientation with respect to the sweep motion at each position. In order to follow the adjacent track 134 during a sweep motion, each transducer is fixed in a mount 135 having four vertical guide rollers 136 embracing the track, two rollers on each side of the track, as shown in FIGS. 9A, 9B, 10 and 11, thus holding the transducers at a fixed angle with respect to the portion of the track embraced.

When the guide frame 125 pivots to its clockwise position after a selected frame 22 has been moved into one of the reading positions, the transducer adjacent the selected wire 43 on the frame is moved thereby to engage the selected wire a short distance, for example, one-half inch, from one end of the frame and depress it inwardly on the frame to establish a predetermined wire tension. Inasmuch as the wire tension would be decreased if the transducer were moved in a straight line parallel to the frame away from either end where the wire is supported, both the tracks 134 are curved outwardly toward the frame so that a transducer moved from one end of its track to the center of the platform 42 projects progressively farther toward the frame, depressing the wire increasingly inwardly on the frame during its sweeping motion and recedes in a similar manner from the center of the platform to the end of the arcuate track. In addition, the curvature of the track 134 pivots the transducer mount 135 during the sweep, positioning the transducer so that the depressed wire always approaches the magnetic gap at the same angle from both sides.

Inasmuch as the magnetic record wires 43 supported on each frame are closely spaced and may be positioned at intervals less than the thickness of the transducer mount 135, the mount includes a separator 137 having sloping upper and lower surfaces 138 projecting inwardly toward the position of the selected wire on the leading side of the transducer during its sweep motion, as shown in FIG. 10. Thus, as the transducer is moved from its inactive location, illustrated in FIG. 9A, the surfaces 138 of the separator spread the wires adjacent a selected record wire 43 while a central groove 139 in the separator 137 engages the selected wire and guides it toward the transducer. On the trailing side of the transducer frame another separator 137*a*, projecting a shorter distance toward the frame and having no central groove, assists in spreading the adjacent wires.

Surrounding each transducer mount 135, a yoke 140 is driven by steel bands 141 to sweep the transducers in opposite directions from one end of the platform to the other, the yokes being constrained in straight-line paths parallel to the guides 40 and 41 by V-rails 142 affixed to the platform 42. Within each yoke 140 a spring clamp 143 holds the transducer mount 135 in a vertically fixed position but permits motion perpendicular to the V-rails and angular turning of the mount within the yoke while the mount is fixed in the yoke in the sweep direction, the leading and trailing edges 144 of the mount being curved as shown in FIGS. 9A and 9B. Accordingly, while the yokes 140 are driven by the bands 141 in a straight line along the platform 42, the transducers 44 and 45 follow arcuate paths determined by the curvature of the tracks 134 and are turned angularly within the yokes 140 as the rollers 136 follow the tracks. At the top of each yoke 140 a terminal strip 145 carries terminal posts 146 electrically connected to the transducers through a cable 147 and projecting vertically into a cable box 148 wherein suitable lengths of cable 149 leading from the terminal posts 146 are disposed to permit the yokes 140 to move freely during the sweep motion. From the cable box 148 the cables 149 are guided to the top of the reading device along two arms 149*a* pivotally mounted at their upper ends in brackets 149*b* mounted on the upper guides 40 and slidably held at their lower ends in slots 149*c* in the cable box, thus preventing fouling of the cables as the platform 42 is raised and lowered within the reading device.

At each end of the platform 42 the drive bands 141 pass around pulleys 150 rotatably mounted on the platform and slidably keyed to vertical shafts 151 and 152 which are rotatably supported by the top plate 34 and the mid-plate 47, as best seen in FIG. 3. At one end of the reading device the shaft 151 extends through the mid-plate 47 to an electromagnetic clutch 153 arranged to connect the shaft 151 to a pulley 154 when energized. Constantly driven by a high speed motor 155 through a belt 156, the pulley 154, which acts as a flywheel, is linked to the clutch 153 by a coupling 157. Preferably, the clutch 153 is arranged to be energized relatively slowly to prevent excessive shock to the transducer drive system. As viewed in FIG. 9B, the drive motor 155 turns the pulleys in the clockwise direction when the clutch is engaged, sweeping the transducer 44 to the left and the transducer 45 to the right by means of the bands 141 and the yokes 140, one of the transducers being in operative relation with a selected record wire 43 as described above. During this half of the drive cycle, referred to as the sweep motion, the transducer in contact with the selected record wire is activated to record or reproduce information from the wire, whereas during the return motion, when the transducer drive system is restored to its starting position, both transducers are kept inactive. Throughout the entire cycle, however, the operating transducer is maintained in contact with the selected record wire.

While travelling the first portion of their sweep motion, for example, the first inch, the transducers are accelerated to their maximum velocity, which may be about ninety inches per second, and this velocity is maintained substantially constant during the active portion of the sweep motion. At the start of its last inch of sweep travel, however, the yoke 140 carrying the transducer 44 contacts one end of a rebound lever 158 pivotally mounted on the platform 42 at one end of the rail 142. As best seen in FIG. 3, the lever 158 extends below the platform and is pivotally connected to a link 159 leading to the plunger 160 of a rebound device 161. Within the rebound device a spring (not shown) urges the plunger 160 to the left as viewed in FIG. 3, normally holding the top end of the lever 158 toward the right. Therefore, when the yoke 140 strikes the lever 158 one inch from the end of its leftward motion, pushing the plunger 160 to the right, the internal spring is compressed to slow the yoke and the transducer sweep drive system to a stop, after which the spring expands, driving the system in the reverse direction to return the yoke to its starting position.

Also mounted below the platform 42, in line with the rebound device, a braking device 162, which may, for example, comprise a unidirectional dash-pot, carries a shaft 163 which is freely movable to the right but resists leftward motion. At its left end the shaft 163 normally abuts a nut 164 mounted on the adjacent end of the plunger 160, while at its right end the shaft is connected through a link 165 to a vertical lever 166, pivotally mounted on the platform 42 and projecting into the path of the yoke 140 at the right-hand end of the rail 142. Thus, when the plunger 160 drives the shaft 163 to the right during the rebound action, the top end of the lever 166 pivots to the left, where it remains until the yoke returns to its starting position. As the yoke approaches the right-hand end of the platform 42 in its return motion, it engages the top end of the lever 166 and is braked to a stop, along with the rest of the transducer drive system, by the resistance of the braking device 162 to leftward motion of the shaft 163. In addition, a reversible electric return motor 167, mounted below the mid-plate 47 and connected to the drive shaft 152, assists in accelerating the transducers during the first inch of their sweep motion and, in the last inch of each sweep motion, this motor is reversed to stop the transducer drive system rapidly and return it to the starting position in conjunction with the rebound device 161. In order to accelerate the transducers to a high speed in the shortest time, the return motor 167 is preferably of the type which develops its greatest torque at a low velocity and decreasing torque at higher velocities.

Automatic control of the actuation of the magnetic clutch 153 and the return motor 167 during each operating cycle is accomplished by utilizing the drive bands 141 as shutters to actuate two photocell units 168, one mounted at each end of the platform 42, as illustrated in FIGS. 9A and 9B. As best seen in FIG. 13, each photocell unit includes a light source 169 mounted to illuminate a mirror 170 which is positioned to reflect light toward the drive band 141 from the outside. Opposite the mirror on the inside of the drive band 141, a shielded photocell 171 responds to light received from the direction of the drive band, each drive band being opaque and having windows 172 at predetermined locations along its length to pass light from the mirror 170 to the photocell 171. With this arrangement, the magnetic clutch 153 and the return motor 167 can be energized in accordance with the position of the magnetic transducers during their sweep by selective operation of the photocells 171. In the typical embodiment of the invention described herein, windows 172 are positioned in the drive bands 141 to permit light from the sources 169 to illuminate both the photocells when the yokes 140 are in the starting position, the light being cut off by the drive bands as soon as the yokes leave this position. Unless a sweep signal directing the start of a sweep cycle has been received, darkening of both the photocells 171 by motion of the yokes away from the starting position energizes the return motor 167 in the reverse direction, urging the drive bands and the yokes back into the starting position. As soon as a sweep signal is received, however, the magnetic clutch 153 is actuated and the return motor 167 is energized in the forward direction to assist in accelerating the transducer drive system rapidly, the photocells 171 being prevented from affecting this operation when they are shut off by the bands 141.

In order to allow time for acceleration and deceleration of the transducer drive system, each of the magnetic record wires 43 mounted on the frames 22 has an active length somewhat less than its total length, leaving an inactive portion at each end of predetermined length, for example, one and one-half inches, where no information is recorded. As pointed out above, the transducer engages the wire at a point one-half inch from the adjacent end of the frame where it is supported when it is moved from the retracted to the advanced position by pivoting of the guide member 125. Similarly, the transducer is stopped one-half inch from the other end of the frame, leaving one inch of inactive wire at each end for acceleration and braking. Accordingly, during the first inch of its sweep motion, the transducer drive system is accelerated to maximum speed by the motors 165 and 167 and when drive bands 141 have travelled one inch another window 172 in one of the bands illuminates one of the photocells 171 momentarily to indicate that the transducers are moving at the recording speed. In response to this signal, the recording or reproducing operation of the transducer in contact with the selected record wire is commenced and the return motor 167 is deenergized, its accelerating action having been completed.

When the transducers are one inch away from the end of the sweep motion, another drive band window 172 activates the other photocell, causing the return motor 167 to be energized in the reverse direction and disengaging the clutch 153. At the same time, the yoke 140 engages the lever 158 coupled to the rebound device 161, compressing the internal spring to reverse the motion of the drive system and cock the braking device 162. On the return stroke the motor 167, still energized in the reverse direction, drives the transducers back to the starting position, the photocell units 168 being inoperative during this portion of the cycle. One inch from the starting position the yoke 140 engages the upper end of the lever 166 and the dash-pot 162 brakes the system to a stop, the return motor 167 remaining energized in the reverse direction until the starting position is attained, when both the photocells are again illuminated by windows 172 in the drive bands.

In operation, the reading device 30 is moved in the aisle 23 by the drive assemblies 27 and 28 in response to an address signal to align a selected frame 22 with that reading position 38 or 39 which disposes the side of the frame supporting the selected wire 43 toward the platform 42. At the same time, the address signal, which also indicates the vertical position of the selected record wire on the frame, is transmitted to the comparer 113. By comparing the actual location of the transducers 44 and 45 with respect to the positioning blocks 48 with the location of the selected wire on the frame, the comparer determines the direction of any difference between these two locations and signals the motor 110 to drive the platform 42 toward the selected wire, both the solenoids 118 being energized to hold the pawls 119 and 120 away from the ratchet wheel 122. When the transducers are within a predetermined vertical distance from the selected record wire, for example, eight wire intervals, the brake 117 is energized to slow the drive motor and the pawls 119 and 120 are released. Then the two solenoids 118 are actuated alternately, permitting the motor to turn the ratchet wheel 122 and the lead screw 101 through an angle equal to one wire interval at a time. This escapement action continues until the transducers are at the same vertical position as the selected wire, when both solenoids are deenergized, locking the platform 42 in a fixed vertical position.

In addition, while the reading device is moving to the proper location the dolly 55 adjacent the appropriate reading position 38 or 39 is driven by the motor 60 to the end of its tracks 56 and 57 next to the rack 20 or 21 holding the selected frame. As soon as the reading device 30 is in postion and the dolly has reached the end of its tracks, the rotary solenoid 84 nearest the selected frame is energized, pulling down the associated actuating plate 88. This extends the guide extension 94 toward the rack and pivots the claw 69 to a horizontal position engaging the hook 68 of the selected frame, the actuating plate being retained in its lower position by the latch lever 91*a* and the stop 91*c*. Completion of the downward stroke operates the associated switch 92 signalling the drive motor 60 to transport the dolly 55 to the other end of its tracks, drawing the frame from the rack into the upper and lower guides 40 and 41. When the frame is in the reading position it is urged upwardly at both ends against the positioning blocks 48 by the spring-biased lever 49, accurately locating the selected wire 43 in the vertical direction with respect to the platform 42.

As soon as the frame is in the reading position, as detected by one of the switches 82 in the dolly braking system, the rotary solenoid 126 is energized to pivot the guide member 125 from the retracted position shown in FIG. 9A to the reading position shown in FIG. 9B. During this motion the separators 137 and 137*a* spread the wires 43 adjacent the selected wire and the notch 139 engages the selected wire and holds it in operative relation with the transducer, which depresses the wire inwardly toward the center of the frame 22 to increase its tension. Actuation of the magnetic clutch 153 and energization of the return motor 167 in the forward direction in response to receipt of a sweep signal starts a transducer sweep cycle, the windows 172 in the drive bands 141 controlling the operation of the clutch 153 and the motor 167 and the activation of the transducer thereafter by means of the photocell units 168 in the manner described above. During the sweep motion each transducer follows its arcuate track 134, depressing the wire 43 more toward the center of the frame to maintain constant tension and turning the transducer mount 135 so that the wire always approaches the magnetic gap at the same angle from each side.

After completion of the operation at a selected wire, which may require several sweep cycles, for example, one for reading the information originally stored on the wire, another to erase that information, a third for recording a new record, and another to check the newly recorded information, the solenoid 126 is deenergized and the spring device 126*a* returns the guide member 125 to the retracted position shown in FIG. 9A. When the switch 131 indicates that this action has been completed, the dolly drive motor 60 pushes the frame 22 back into its storage position in the rack. As the pin 71 enters the recess 91 in the lowered actuating plate 88 at the end of this motion, it engages the bottom end of the latch lever 91*a*, pivoting it to release the stud 91*b* from beneath the stop 91*c*. This permits the spring 90 to pull the actuating plate back to its upper position, rotating the crank arm 70 through the pin 71 to pivot the claw 69 to its vertical position and, at the same time, retracting the guide extension 94. When this action is completed, as detected by operation of the switch 99, the reading device is in condition to be moved to another position for the next reading or recording operation.

Exemplifying the efficiency, compactness, and rapid operation of apparatus constructed according to the invention, a typical reading device of the type described herein completes an entire reading or recording operation in a maximum time of five seconds. Moving in an aisle between two racks holding several thousand frames each, the reading device 30 can be driven from the location of any frame to that of any other frame within one and one-half seconds, the dolly 55 being driven to the proper position at the same time. Within one second, the dolly can withdraw the selected frame, which has 136 record wires on each side, horizontally supported at vertical intervals of 0.020 inch, and secure it against the positioning blocks 48.

While these operations are taking place, the drive motor 110 and the pawls 119 and 120 operate to move the transducers from any vertical position to the level of the selected wire, this motion being completed in a maximum time of two and one-quarter seconds, and, after the frame is in position, the guide member 125 pivots to move one of the transducers into operative relation with the wire in one-quarter second. With an active record wire length of seven inches, up to five transducer sweep cycles can be completed in one and one-quarter seconds, the transducer being retracted and the frame returned to its storage position within one second.

Although the invention has been described herein with reference to a specific embodiment, many modifications and variations therein will readily appear to those skilled in the art. Accordingly, all such variations and modifications are included within the intended scope of the invention as defined by the following claims.

I claim:

1. Apparatus for reading a magnetic record wire supported on a frame member comprising a housing, means for positioning the frame member with respect to the housing, transducer means movable into operative relation with the magnetic record wire, drive means for sweeping the transducer means lengthwise of the wire, and arcuate track means for guiding the transducer means in a path curved toward the frame member to depress the record wire inwardly on the frame member to maintain the tension of the wire substantially constant throughout the sweep motion.

2. Apparatus for reading a magnetic record wire supported on a frame member comprising a housing, means for positioning the frame member with respect to the housing, transducer means movable into operative relation with the magnetic record wire to depress the wire inwardly on the frame member, drive means for sweeping the transducer means lengthwise of the wire, arcuate track means for guiding the transducer means in a curved path during its sweep motion, and guide means following the arcuate track means to control the angular position of the transducer means with respect to the sweep direction during the sweep motion so that the wire approaches the transducer means at the same angle from both sides.

3. Apparatus according to claim 2 wherein the guide means includes a pair of spaced rollers in contact with the track means positioning the transducer means on a line substantially perpendicular to the plane of the rollers.

4. Apparatus for reading a magnetic record wire supported on a frame member comprising a housing, means for positioning the frame member with respect to the housing, transducer means movable into operative relation with the magnetic record wire to depress the wire inwardly on the frame member, drive means for sweeping the transducer means lengthwise of the wire, arcuate track means for guiding the transducer means in a path curved toward the frame member depressing the wire further during the sweep motion to maintain substantially constant wire tension, and transducer mount means holding the transducer means in fixed angular relation to the adjacent portion of the track means at each point in the sweep motion so that the wire approaches the transducer means at the same angle from both sides.

5. Apparatus for reading a magnetic record wire supported on a frame member comprising a housing, means for positioning the frame member with respect to the housing, transducer means movable lengthwise of the wire, drive means for sweeping the transducer lengthwise of the wire, arcuate track means for guiding the transducer means in a path curved toward the frame member, and means for moving one end of the arcuate track means between two positions to place the transducer means in operative relation with the wire in one position and retract it from the wire in the second position when the transducer means is at that end of the track means.

6. Apparatus for reading a magnetic record wire supported at a known location on a frame member comprising a housing including frame positioning means, means for urging the frame member against the frame positioning means in a direction transverse to the axis of the record wire to position the record wire at a known location with respect to the housing, transducer means movable into operative relation with the magnetic record wire positioned at the known location, drive means for sweeping the transducer means lengthwise of the wire, and arcuate track means for guiding the transducer means in a path curved toward the frame member to depress the record wire inwardly on the frame member to maintain the tension of the wire substantially constant throughout the sweep motion.

7. Apparatus for reading a magnetic record wire supported at a known location on a frame member comprising a housing including frame positioning means, means for urging the frame member against the frame positioning means in a direction transverse to the axis of the record wire to position the record wire at a known location with respect to the housing, transducer means movable into operative relation with the magnetic record wire positioned at the known location to depress the wire inwardly on the frame member, drive means for sweeping the transducer means lengthwise of the wire, arcuate track means for guiding the transducer means in a curved path during its sweep motion, and guide means following the arcuate track means to control the angular position of the transducer means with respect to the sweep direction so that the wire approaches the transducer means at the same angle from each side.

8. Apparatus for reading a magnetic record wire supported at a known location on a frame member comprising a housing including frame positioning means, means for urging the frame member against the frame positioning means in a direction transverse to the axis of the record wire to position the record wire at a known location with respect to the housing, transducer means movable into operative relation with the magnetic record wire positioned at the known location to depress the wire inwardly on the frame member, drive means for sweeping the transducer means lengthwise of the wire, arcuate track means for guiding the transducer means in a path curved toward the frame member depressing the wire further during the sweep motion to maintain substantially constant wire tension, and transducer mount means holding the transducer means in fixed angular relation to the adjacent portion of the track means at each point in the sweep motion so that the wire approaches the transducer means at the same angle from both sides.

9. Apparatus for reading a magnetic record wire supported at a known location on a frame member comprising a housing including frame positioning means, means for urging the frame member against the frame positioning means in a direction transverse to the axis of the record wire to position the record wire at a known location with respect to the housing, transducer means movable into operative relation with the magnetic record wire positioned at the known location, drive means for driving the transducer means lengthwise of the wire, arcuate track means for guiding the transducer means in a path curved toward the frame member, and means for moving one end of the arcuate track means between two positions to place the transducer means in operative relation with the wire in one position and retract it from the wire in the second position when the transducer means is at that end of the track means.

10. Apparatus for reading a magnetic record wire supported at a known location on a frame member comprising a housing including frame positioning means for holding the record wire at a known location with respect to the housing, transducer means movable to any of a plurality of known positions with respect to the housing adjacent the frame member, transducer drive means for moving the transducer means at relatively high speed toward a position adjacent the magnetic wire, escapement means permitting a step-by-step motion of the transducer drive means when the transducer means is within a predetermined distance from the wire and locking the transducer drive means when the transducer means reaches a position with respect to the housing corresponding to that of the wire, means for moving the transducer into operative relation with the wire, drive means for sweeping the transducer means lengthwise of the wire, and arcuate track means for guiding the transducer means in a path curved toward the frame member during the sweep motion to depress the record wire inwardly on the frame member to maintain the tension of the wire substantially constant throughout the sweep motion.

11. Apparatus for reading a magnetic record wire supported on a frame member comprising a housing, means for positioning the frame member with respect to the housing, transducer means movable into operative relation with the magnetic record wire, drive means for sweeping the transducer means lengthwise of the wire, connecting means linking the drive means with the transducer means, indicating means associated with the connecting means indicating selected positions of the transducer means during its sweep motion along the wire, detecting means responsive to the indicating means for controlling the drive means according to the position of the transducer means in its sweep motion, and arcuate track means for guiding the transducer means in a path curved toward the frame member to depress the record wire inwardly on the frame member to maintain the tension of the wire substantially constant throughout the sweep motion.

12. Apparatus for reading a selected one of a plurality of magnetic record wires supported at known positions in closely spaced relation on a frame member comprising a housing including frame positioning means for holding the selected magnetic record wire at a known location with respect to the housing, transducer means movable to any of a plurality of known positions with respect to the housing adjacent the frame member, transducer drive means for moving the transducer means at relatively high speed toward a position adjacent the selected wire, escapement means permitting a step-by-step motion of the transducer drive means when the transducer means is within a predetermined distance from the wire and locikng the transducer drive means when the transducer means reaches a position with respect to the housing corresponding to that of the selected wire, drive means for sweeping the transducer means lengthwise of the selected wire, connecting means linking the drive means with the transducer means, indicating means associated with the connecting means indicating selected positions of the transducer means during its sweep motion along the wire, and detecting means responsive to the indicating means for controlling the drive means according to the position of the transducer means during its sweep motion.

13. Apparatus for reading a magnetic record wire supported on a frame member stored in a rack comprising a housing movable with respect to the rack to a position adjacent the frame member, guide means for receiving the frame member and positioning it at a predetermined location with respect to the housing, dolly means movable parallel to the guide means for driving the frame member from the rack into the guide means, connecting means on the dolly means actuable to link the frame member and the dolly means, transducer means movable into operative relation with the wire when the frame is positioned at the predetermined location with respect to the housing, drive means for sweeping the transducer means lengthwise of the wire, and arcuate track means for guiding the transducer means in a path curved toward the frame member to depress the wire inwardly on the frame member to maintain the tension of the wire substantially constant throughout the sweep motion.

14. Apparatus for reading a magnetic record wire supported on a frame member stored in a rack comprising a housing movable with respect to the rack to a position adjacent the frame member, guide means for receiving the frame member and positioning it at a predetermined location with respect to the housing, dolly means movable parallel to the guide means for driving the frame member from the rack into the guide means, connecting means on the dolly means actuable to link the frame member and the dolly means, transducer means movable into operative relation with the wire when the frame is positioned at the predetermined location with respect to the housing, drive means for sweeping the transducer means lengthwise of the wire, arcuate track means for guiding the transducer means in a curved path during its sweep motion, and guide means following the arcuate track means to control the angular position of the transducer means with respect to the sweep direction during the sweep motion so that the wire approaches the transducer means at the same angle from both sides.

15. Apparatus for reading a magnetic record wire supported on a frame member stored in a rack comprising a housing movable with respect to the rack to a position adjacent the frame member, guide means for receiving the frame member and positioning it at a predetermined location with respect to the housing, dolly means movable parallel to the guide means for driving the frame member from the rack into the guide means, connecting means on the dolly means actuable to link the frame member and the dolly means, transducer means movable to any of a plurality of known positions with respect to the housing adjacent the frame member, transducer drive means for moving the transducer means at relatively high speed toward a position adjacent the magnetic wire, and escapement means permitting a step-by-step motion of the transducer drive means when the transducer means is within a predetermined distance from the wire and locking the transducer drive means when the transducer means reaches a position with respect to the housing corresponding to that of the wire.

16. Apparatus for reading a magnetic record wire supported on a frame member stored in either of two opposed racks comprising a housing movable between the two racks to a position adjacent the frame member, guide means for receiving the frame member from either of the two racks and positioning it at a predetermined location with respect to the housing, dolly means movable parallel to the guide means for withdrawing the frame member from either rack, connecting means on the dolly means actuable to link the frame member and the dolly means, and transducer means associated with the housing movable into operative relation with the wire when the frame is positioned at the predetermined location with respect to the housing.

17. Apparatus for reading a selected one of a plurality of magnetic record wires supported in two arrays on opposite sides of a frame member stored in a rack comprising a housing movable with respect to the rack to a position adjacent the frame member, guide means for receiving the frame member and positioning it at a predetermined location with respect to the housing, transducer means associated with the housing including a first magnetic head movable into operative relation with any of the magnetic record wires supported on one side of the frame member and a second magnetic head movable into operative relation with any of the magnetic record wires supported on the other side of the frame member.

18. Apparatus for reading a selected one of a plurality of magnetic record wires supported in two arrays on opposite sides of a frame member stored in either of two opposed racks comprising a housing movable between the two racks to a position adjacent the frame member, guide means for receiving the frame member from either of the two racks and positioning it at a predetermined location with respect to the housing, transducer means associated with the housing including a first magnetic head movable into operative relation with any of the magnetic record wires supported on one side of the frame member and a second magnetic head movable into operative relation with any of the magnetic record wires supported on the other side of the frame member.

19. Apparatus for reading a selected one of a plurality of magnetic record wires supported in two arrays on opposite sides of a frame member stored in a rack comprising a housing movable with respect to the rack to a position adjacent the frame members, guide means for receiving the frame member in either of two reading positions and positioning it at a predetermined location with respect to the housing, and transducer means associated with the housing including a first magnetic head movable into operative relation with any of the magnetic wires supported on one side of a frame member located in one of the reading positions and including a second magnetic head movable into operative relation with any of the magnetic wires supported on the other side of a frame member located in the other reading position.

20. Apparatus for reading a selected one of a plurality of magnetic record wires supported in two arrays supported on opposite sides of a frame member stored in either of two opposed racks comprising a housing movable between the two racks to a position adjacent the frame member, guide means for receiving the frame member in either of two reading positions from either of the two racks and positioning it at a predetermined location with respect to the housing, transducer means movable into operative relation with the magnetic record wire positioned at the known location to depress the wire inwardly on the frame member, drive means for driving the transducer means lengthwise of the wire, arcuate track means for guiding the transducer means in a path curved toward the frame member depressing the wire further during the sweep motion to maintain substantially constant wire tension, and transducer mount means holding the transducer means in fixed angular relation to the adjacent portion of the track means at each point in the sweep motion so that the wire approaches the transducer means at the same angle from both sides.

References Cited in the file of this patent

UNITED STATES PATENTS 2,080,100 Tauschek -------------- May 11, 1937

2,265,879 Thurm ---------------- Dec. 9, 1941
2,416,445 Jensen ---------------- Feb. 25, 1947
2,498,746 Walker ---------------- Feb. 28, 1950
2,620,389 Potter ---------------- Dec. 2, 1952
2,650,830 Potter ---------------- Sept. 1, 1953
2,652,196 Sterling --------------- Sept. 15, 1953
2,674,728 Potter ---------------- Apr. 6, 1954
2,869,876 Brasseur -------------- Jan. 20, 1959
2,914,752 MacDonald ----------- Nov. 24, 1959

OTHER REFERENCES

"Instruments and Automation," vol. 29, pp. 2208–2211, by G. Comstock, November 1956.